(12) United States Patent
Garcia De La Pena Razquin

(10) Patent No.: US 11,015,571 B2
(45) Date of Patent: May 25, 2021

(54) INNER COVERING FOR WIND TURBINE BLADES AND METHOD FOR MOUNTING SAME

(71) Applicant: EMPRENDING BUSINESS, S.L., Gorraiz (ES)

(72) Inventor: Emmanuel Garcia De La Pena Razquin, Gorraiz (ES)

(73) Assignee: EMPRENDING BUSINESS, S.L., Gorraiz (ES)

( * ) Notice: Subject to any disclaimer, the term of this patent is extended or adjusted under 35 U.S.C. 154(b) by 381 days.

(21) Appl. No.: 16/062,996

(22) PCT Filed: Dec. 13, 2016

(86) PCT No.: PCT/ES2016/070885
§ 371 (c)(1),
(2) Date: Jun. 15, 2018

(87) PCT Pub. No.: WO2017/103308
PCT Pub. Date: Jun. 22, 2017

(65) Prior Publication Data
US 2020/0291918 A1    Sep. 17, 2020

(30) Foreign Application Priority Data

Dec. 17, 2015   (ES) ................................ ES201531829

(51) Int. Cl.
*F03D 1/06* (2006.01)
*B29C 70/44* (2006.01)
(Continued)

(52) U.S. Cl.
CPC ............ *F03D 1/0675* (2013.01); *B29C 70/44* (2013.01); *B29C 70/54* (2013.01);
(Continued)

(58) Field of Classification Search
CPC .......... F03D 1/0675; F03D 1/065; F03D 1/06; B29C 70/44; B29C 70/54; B29K 2307/04; B29K 2309/08
See application file for complete search history.

(56) References Cited

U.S. PATENT DOCUMENTS

| 3,144,349 | A | * | 8/1964 | Teague | .................. B32B 15/08 416/1 |
| 2012/0237356 | A1 | * | 9/2012 | Mironov | ............... B29C 70/342 416/232 |
| 2015/0216388 | A1 | | 8/2015 | Bewley, Jr. et al. | |

FOREIGN PATENT DOCUMENTS

| EP | 0865900 A1 | 9/1998 |
| EP | 2236817 A2 | 10/2010 |
| EP | 2667018 A2 | 11/2013 |

OTHER PUBLICATIONS

International Search Report and Written Opinion dated Apr. 13, 2017 for PCT/ES2016/070885 and English translation.

* cited by examiner

*Primary Examiner* — Igor Kershteyn
*Assistant Examiner* — Joshua R Beebe
(74) *Attorney, Agent, or Firm* — Lucas & Mercanti, LLP

(57) ABSTRACT

Inner covering for wind turbine blades and method for mounting same, wherein said covering consists of a wall cover with a flexible wall which is formed based on layers of composite materials, having shapes and dimensions being approximately the same as those of the inner area of the blade structural element, said cover being mounted on a support with which it is introduced inside the blade. Between the support and the cover, an inflatable chamber is arranged, which upon being inflated causes the cover to be compacted and adhered against the inner surface of the blade structural element.

13 Claims, 14 Drawing Sheets

(51) Int. Cl.
    *B29C 70/54*     (2006.01)
    *B29K 307/04*     (2006.01)
    *B29K 309/08*     (2006.01)
    *B29L 31/08*     (2006.01)

(52) U.S. Cl.
    CPC ...... *B29K 2307/04* (2013.01); *B29K 2309/08* (2013.01); *B29L 2031/085* (2013.01)

Section II-II

INNER COVERING FOR WIND TURBINE BLADES AND METHOD FOR MOUNTING SAME

CROSS REFERENCE TO RELATED APPLICATION

This Application is a 371 of PCT/ES2016/070885 filed on Dec. 13, 2016, which, in turn, claimed the priority of Spanish Patent Application No. P201531829 filed on Dec. 17, 2015, both applications are incorporated herein by reference.

FIELD OF THE INVENTION

The present invention relates to an inner covering for wind turbine blades, particularly applicable to blades that have become damaged due to the fatigue they were subjected to throughout the years of operation, and has the purpose of prolonging the service life of the blades beyond the period of service life for which they were designed. Another object of the invention is the method for mounting the covering on a wind turbine blade.

BACKGROUND OF THE INVENTION

Wind turbine blades are usually designed to have a service life of 20 years. This service life is conditioned by the different compression and tension cycles to which the composite materials of the structural element of the blade (the beam in blades manufactured using the fiber and resin pre-impregnation method, or the reinforced shell itself in the case of blades manufactured using the infusion method) are subjected. Those tension and compression cycles, as a result of the blade bending during the operation of the wind turbine, cause fatigue in said composite materials leading to the blade breaking when the cycles for which it has been designed are surpassed.

At present, when the blade surpasses the cycles for which it has been designed, or in other words, its service life, it is replaced with another new or refurbished blade, the remaining service life of which justifies the cost of replacement.

There is no other known solution for solving the foregoing problem than that of replacing the blade which has reached the end of its service life due to fatigue with another new blade.

There are systems for reinforcing a specific area that is weakened due to the existence of a design/manufacturing problem or to damage caused by an accident such as the system described in patent document ES2461390 which defines a system for reinforcing a weakened area of a wind turbine blade which allows reinforcing a weakened area of a wind turbine blade when the blade is mounted on the wind turbine. Only the weakened area of the blade is reinforced by means of this system, so the rest of the blade is not reinforced, and therefore is at risk of there being new weakened areas, in the attempt to prolong the service life of the blade.

On the other hand, the system object of patent document ES2461390 is only applicable to blades having a beam-shell structure and not to infusion-type blades.

According to the system of patent document ES2461390, the reinforcements must be cured before being applied on the area of the blade to be reinforced, which leads to problems relating to adaptation on the surface to be reinforced, as well as the need for motorized positioning equipment for introducing and transporting the reinforcement through the blade to the area where it must be applied.

DESCRIPTION OF THE INVENTION

The object of the present invention is to provide an inner covering for wind turbine blades, as well as the method for mounting same on the inside of a wind turbine blade, so as to eliminate the aforementioned problems and so that it allows reinforcing the entire blade, thereby assuring the prolongation of its service life.

According to the invention, the covering consists of a sheath with a flexible wall which has shapes and dimensions that are about the same as the inner shapes and dimensions of the structural element of the blade for which said covering is intended, from the root to the tip, and is open at the root thereof. This sheath is formed by precut layers of fabrics of composite materials based on glass or carbon fibers and resins that are not cured or only partially cured, which are applied, fixed, and cured on the inner surface of the structural element of the blade.

The sheath can be obtained in one-piece or in two longitudinal halves. According to another feature of the invention, the wall of the sheath is prolonged from the open root to a neck-like outer peripheral channel.

The method consists of applying the sheath forming the mentioned covering inside a blade, on the structural element thereof, the materials of which have lost their mechanical properties because they are close to the end of their service life or have surpassed same.

This sheath is added on the inner surface of the structural element of the blade, thereby adhering to the surfaces that have become damaged due to fatigue, providing the blade assembly with mechanical properties similar to those it originally had, which allows extending the service life thereof for a period of time enough to justify the cost of intervention.

In the case of blades manufactured with pre-impregnated materials, the additional sheath adheres to the inner faces of the beam which support bending moments and perform the function of a structural element (these faces are referred to as CAPS). After the additional sheath adheres to the CAPS, this additional sheath will perform the support function and the function of transmitting forces to the root of the blade, and from there to the hub of the wind turbine.

In the case of blades manufactured by infusion, the sheath will adhere to the inner faces of the reinforced shells which in this type of technology act as a structural element and wire for transmitting loads to the hub.

The sections and materials of the sheath will be calculated and designed to provide the blade with mechanical properties required for it to operate properly under optimum safety conditions during the period of time its service life is extended.

The sheath will predictably be made of composite materials, glass fiber with resin, or carbon fiber with resin.

In the preferred embodiment, the sheath made of glass or carbon fiber wraps the interface between the root of the blade and the hub with a type of neck, in the form of an outer peripheral channel, externally overlapping the wall of the blade a sufficient length for the assembly bolts of the blade to go through same. This sheath will have a dimension such that it will internally cover the entire length of the blade, up to the tip or end thereof.

According to the method of the invention, the sheath with a flexible wall is formed on a preforming mold, said sheath having shapes and dimensions that are about the same as the inner shapes and dimensions of the structural element of the blade, from its open root thereof to its end or tip. This sheath is formed based on precut layers of fabrics of composite materials, preferably based on glass or carbon fibers and resins that are not cured or only partially cured.

On the other hand, blasting and cleaning of the inner surface of the blade is carried out and the formed sheath is then introduced therein. To that end, the sheath is mounted on a tool or support which is introduced with the sheath into the blade through the open root thereof, until reaching the tip. There is arranged between the tool or support and the sheath an inflatable chamber which, by means of the inflation thereof, is capable of attaining the internal volume of the structural element of the blade with its shapes and dimensions, and is introduced in the blade. By means of pressurizing the inflatable chamber, the sheath is compacted against the inner surface of the structural element of the blade, until said sheath takes on the inner shapes of and adheres to said blade.

Hot air is then blown through the blade until the composite materials forming the sheath are cured and hardened, as well as adhere to the inner surface of the structural element of the blade.

In order to introduce and drive the tool or support through the blade, it is pulled with cables which are extracted through holes made at the tip or end of the blade and are closed once the process ended.

The sheath preferably ends at its open root in a neck, in the form of an outer peripheral channel, which is coupled on the edge of the wall of the blade limiting the open root thereof, externally overlapping said wall a sufficient length for the assembly bolts to go through same.

The sheath can be formed in one-piece or longitudinally split into two or more parts which are introduced into the blade mounted on the tool or support, with interposition of the inflatable chamber, as described.

The sheath is attached to the inner surface of the structural element of the blade by means of the resin of the composite material forming the sheath, and with the addition of a reinforcement adhesive, if necessary.

As a preferred embodiment, the inside of the actual blade whose service life is to be prolonged can be used as a mold. To that end, the process will be started with an operation of blasting and cleaning the inside of the structural element of the blade to assure proper adhesion of the sheath. Precut fabrics of composite material that are not cured or only pre-cured, but still flexible, would then be introduced into the blade to be repaired by means of using cables, opening small holes at the tip. Other mounting tools or supports are possible. The precut fabrics will adhere on the inner surface of the structural element with their own resin, or a reinforcement adhesive would be applied, if necessary. Thereafter, the fabrics will be compacted by means of introducing through the inside of the blade an inflatable chamber or sleeve that will then be pressurized to achieve proper compaction of the fabrics. Meanwhile, hot air is blown until the composite materials are completely cured and hardened. The fabrics thereby adhere as close as possible to the contour of the inside of the structural element of the blade, thereby allowing proper operation of the glued surfaces by way of cutting, tension, and compression.

The additional sheath will preferably be placed close to the base of the wind turbine in the wind farm for minimizing special transportations.

In those blades having a balancing block adhered to the inside of the structural element, said block will have to be extracted before installing the covering object of this invention.

This extraction will require first separating the balancing block from the walls of the structural element of the blade, an operation which can be carried out by means of detaching the block by applying heat or by means of cutting the layer of adhesive attaching the block to the surface of the structural element, and then pulling said block for extraction through the open root of the blade.

BRIEF DESCRIPTION OF THE DRAWINGS

A non-limiting embodiment is shown in the attached drawings in which.

DETAILED DESCRIPTION OF AN EMBODIMENT

Figure 1:
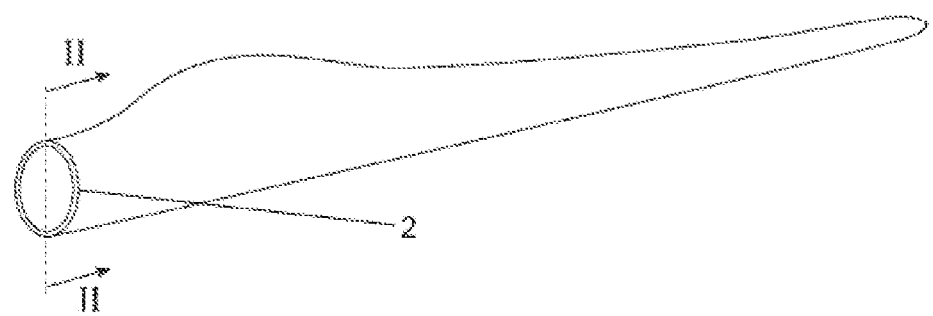
FIG. 1 shows a perspective view of a wind turbine blade.

The features of the invention will be better understood with the following description of the embodiment shown in the drawings described above.

Figure 2:
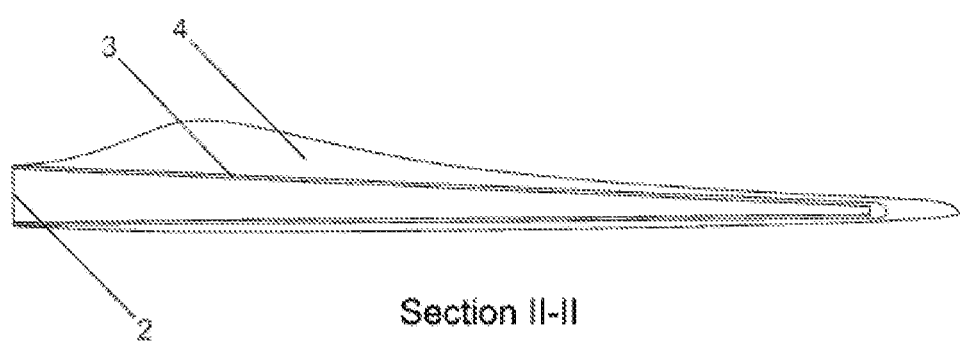
FIG. 2 shows a longitudinal section of the same blade, according to section line II-II of FIG. 1.

FIGS. 1 and 2 show a wind turbine blade that is open at the root thereof (2), of the type manufactured with pre-impregnated composite materials (usually glass or carbon fiber with epoxy resin), and made up of a structural element (3), referred to as beam, and a shell (4).

The method of the invention is based on the placement of a reinforcement sheath inside the blade which, in the case of blades manufactured with pre-impregnated materials, will adhere to the inner faces of the structural element (3) or beam supporting bending moments. In the case of blades manufactured by infusion, the sheath will adhere to the inner faces of the reinforced shells.

Figure 4:
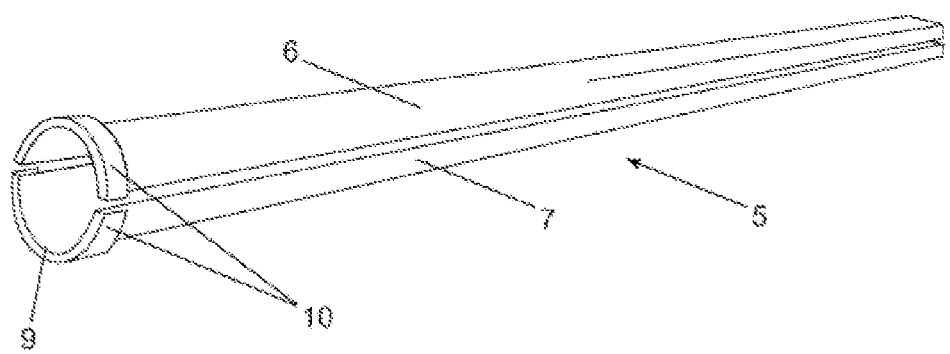
FIG. 4 shows a perspective view of a possible way of making a covering in the form of a sheath split into two parts for a wind turbine blade.
Figure 5:
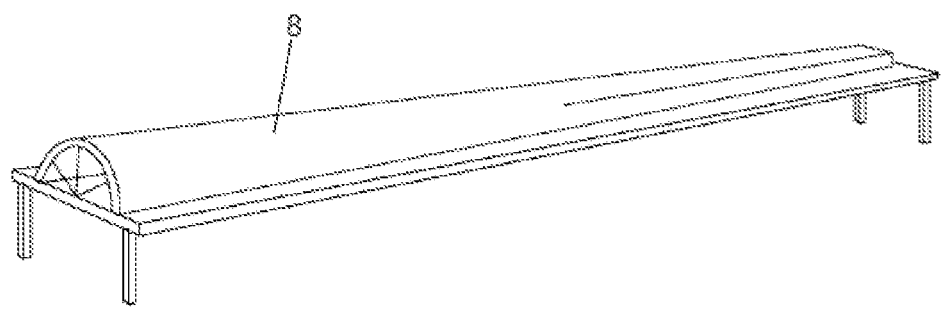
FIG. 5 shows a perspective view of the preforming mold used in the formation of the sheath of FIG. 4.

FIG. 4 shows a sheath (5) for the aforementioned purpose, split longitudinally into two parts (6 and 7), each of which is obtained in a preforming mold (8), FIG. 5, by means of precut layers of fabrics of composite materials. The sheath (5) also has an open root (9), and adjacent to this open root, the wall of the sheath is prolonged forming an outer peripheral channel (10).

The sheath (5) is introduced into the blade (1) through the open root (2) thereof and is coupled and fixed to the inner surface of the structural element (3).

Figure 3:
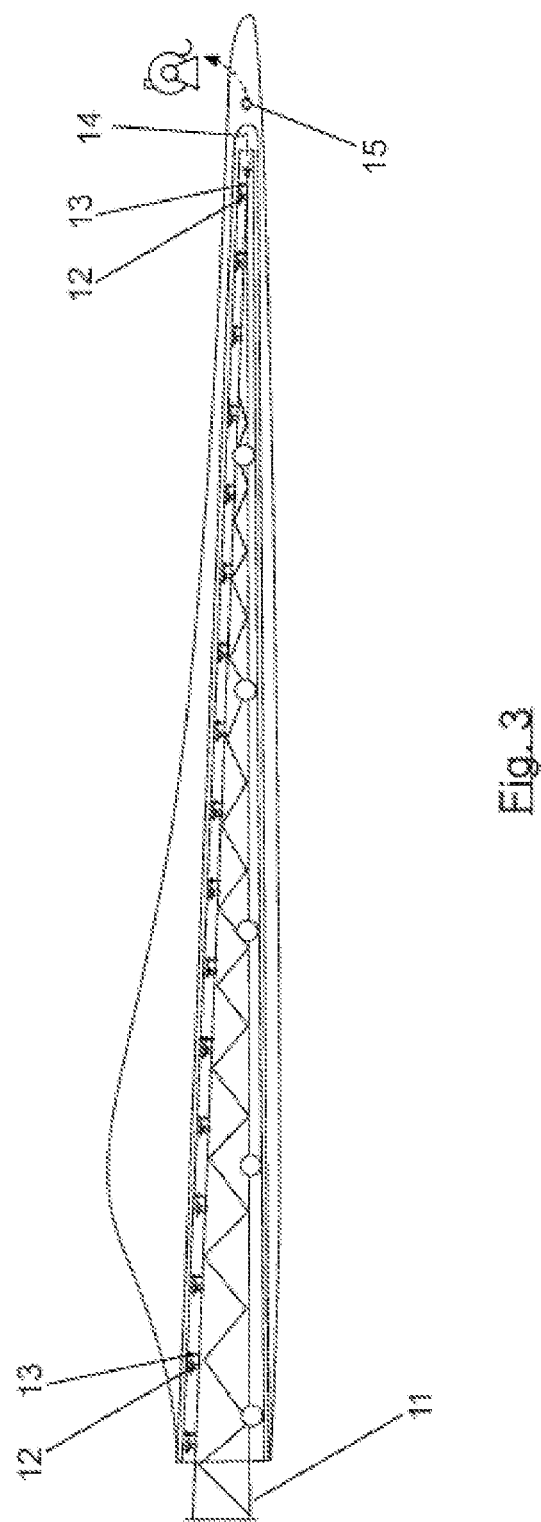
FIG. 3 is a section similar to FIG. 2, showing a phase of blasting and cleaning the inner surface of the blade.

Before mounting the sheath (5) on the blade (1), the inner surface of the structural element thereof is cleaned, which operation can be carried out with a tool (11), FIG. 3, incorporating blasting nozzles (12) and cleaning nozzles (13). This tool can be introduced into the blade (1) by pulling with cables (14) which are extracted through holes (15) made at the tip of the blade (1).

Figure 6:
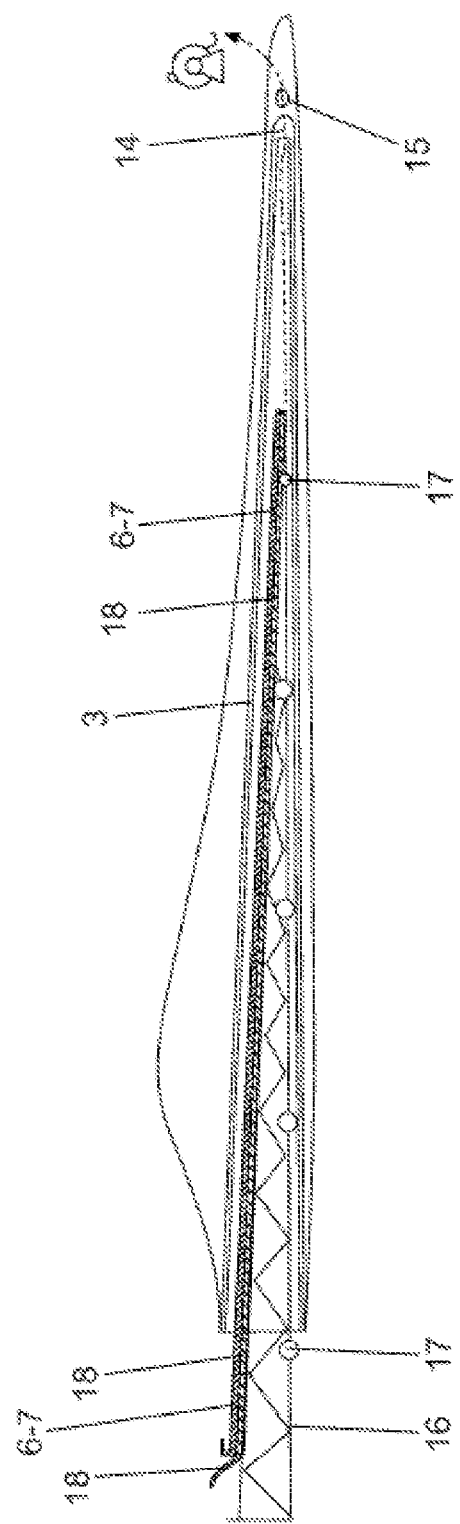
FIG. 6 shows, in a longitudinal section view of the blade, the phase of mounting the sheath on the inside of the blade.

For coupling the sheath (5) inside the blade (1), the parts (6 and 7) forming said sheath are mounted on a tool or support (16), FIG. 6, which can be introduced into the blade in a manner similar to that described for the tool (11), i.e., by pulling with the cables (14) extracted through holes made close to the tip of the blade (1). To make this operation easier, the support or tool (16) can have wheels (17). An inflatable bag or chamber (18) is arranged between the tool (16) and the parts (6 and 7) of the sheath.

Figure 7:
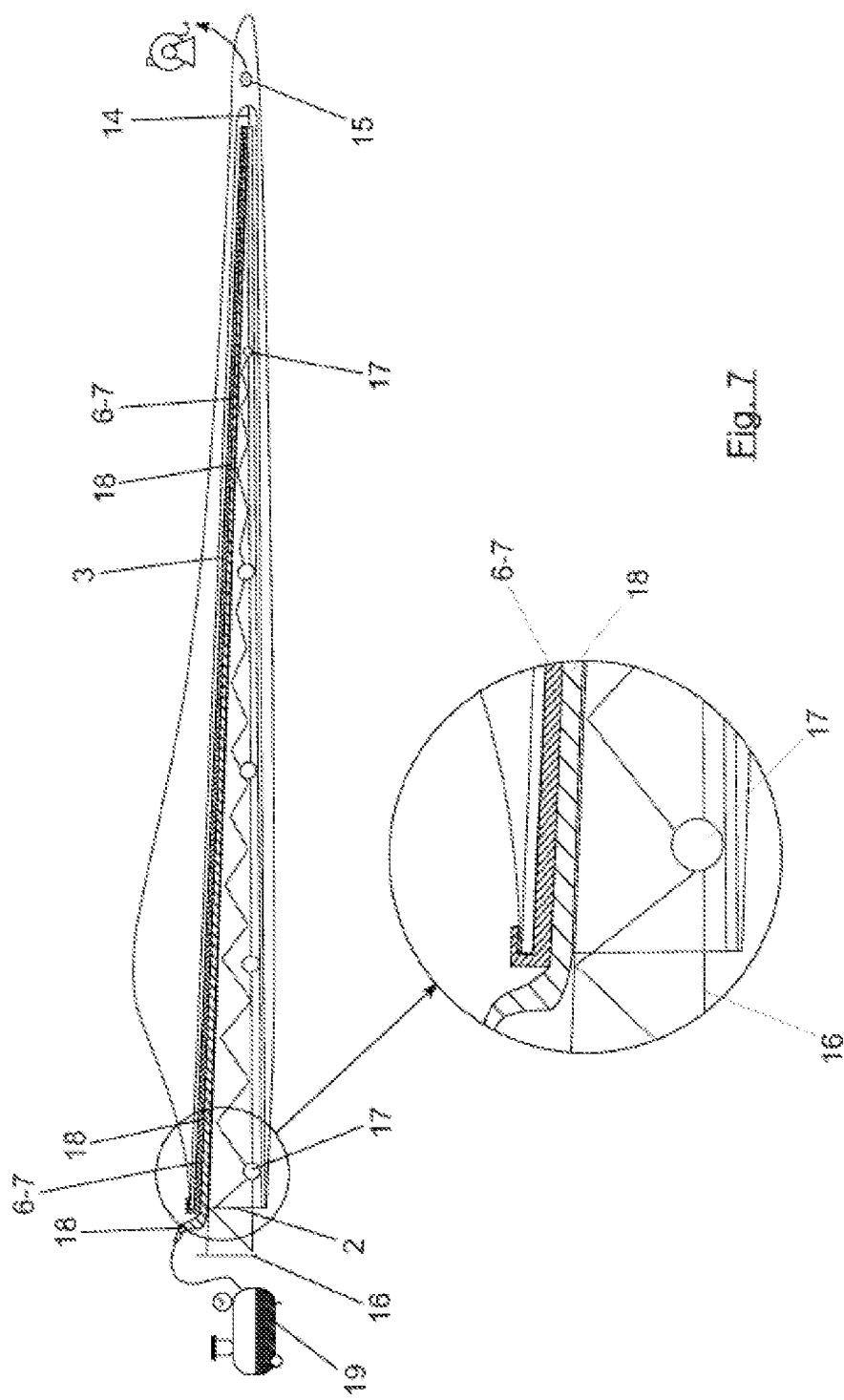
FIG. 7 is a view similar to FIG. 6, where the sheath has been introduced all the way to the tip and the phase of compacting and attaching the sheath on the inner surface of the blade is shown.

Once the tool (16) has reached its correct position inside the blade, FIG. 7, the inflatable bag or chamber (18) is inflated by means of a compressor (19), for example. With this operation, the parts (6 and 7) of the sheath are compacted against the inner surface of the structural element (3) of the blade, until they are completely coupled on said surface. Finally, the fabrics forming the parts (6 and 7) of the sheath are cured, and they adhere to the inner surface of the blade. A reinforcement adhesive can be used, if necessary.

This operation can be carried out by injecting hot air through the open root of the blade or by means of the inclusion of electric heating blankets on the outside of the shells (4) in the area where they adhere to the structural element (3) or between the inflatable chamber (18) and the fabrics of composite materials forming the sheath (5) or the parts (6 and 7) of said sheath.

If the sheath is made up of two parts (6 and 7), once one of the parts (6 or 7) of the sheath is mounted on the blade in the described manner, the blade (1) is rotated, and the same is performed for mounting the other part (7 or 6) of the sheath.

Finally, the holes (15) made for pulling the cables (14) are closed.

The sheath can be formed by one, two, or more parts.

In another embodiment, the inside of the actual blade to be reinforced could be used as a mold for the formation of the sheath.

The outer peripheral channel (10) of the sheath, FIG. 4, is coupled on the edge of the wall of the blade adjacent to the open root (2) thereof so that the assembly bolts for attaching said blade to the hub of the rotor of the wind turbine can go through same.

The sheath forming the reinforcement of the blade is also applicable to blades manufactured by infusion, where the structural element (beam) and the shell are combined into a single element.

Figure 8:
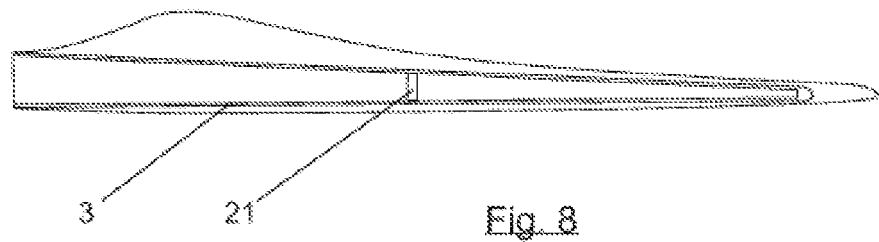
FIG. 8 shows a side section of a wind turbine blade similar to FIG. 2, incorporating in this case a balancing block glued to the beam on the inner face thereof.

In beams (3) with a balancing block (21), FIG. 8, the balancing block (21) is adhered to the inside of the beam (3) in a specific radius and with a predetermined weight so that the rotor does not lose balance when it rotates.

Figure 9:
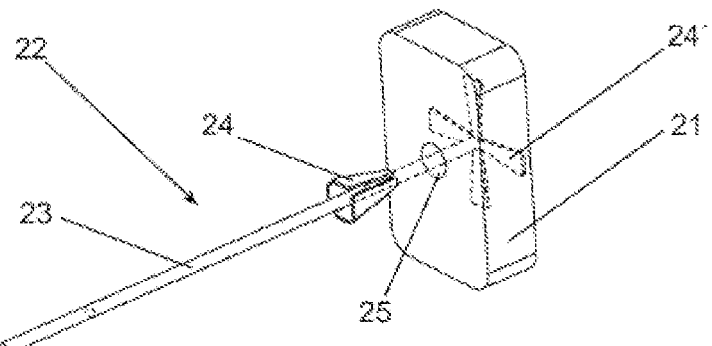
FIG. 9 shows a perspective view of the balancing block outside the blade, with the extraction tool for extracting same.
Figure 10:
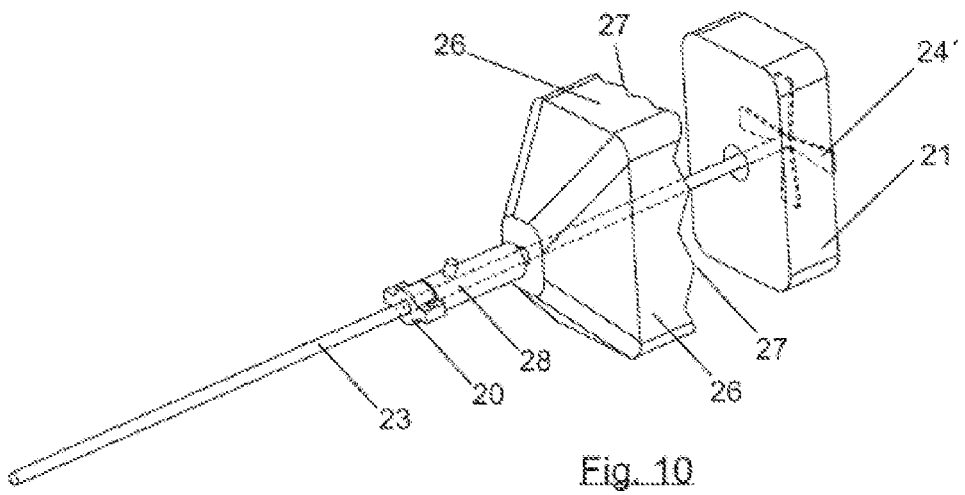
FIG. 10 is a schematic perspective view of the entire tool for extracting the balancing block.

To carry out the method of the invention, it will be necessary to first extract the balancing block. This block can be extracted by means of applying heat on the faces of the balancing block, until exceeding the disintegration temperature of the adhesive attaching said block to the walls of the beam, or by means of processes of cutting the layer of adhesive attaching the block to the walls of the beam. According to a possible way of implementation, the balancing block (21) can be extracted by means of cutting the layer of adhesive attaching said block to the walls of the beam (3) with a tool (22) like the one depicted in FIGS. 9 and 10, made up of a central rod (23) to one of the ends of which there are articulated arms (24) which swing between a folded position, shown by means of a solid line in FIG. 9, and a deployed position, shown by means of a dashed line in the same drawing with reference (24').

The tool with the folded arms (24) can go through the central passage (25) of the balancing block (21). Once the arms (24) went through the block, they can be deployed to position (24'). The block is then extracted by pulling the central rod (23).

Since the balancing block (21) is adhered to the inner surface of the beam (3), in order to be able to extract said block, it will be necessary to first detach it from the beam. To that end, there can be combined with the tool (22) a set of scrapers (26) which are mounted around the central rod (23), with the capacity to move along same, and define a contour which is the same as the inner contour of the beam (3), with a sharp edge (27) facing the arms (24). A hollow actuation cylinder (28) which acts on a locking element (20) integral with the rod (23) when the cylinder (28) is activated is arranged behind the scrapers and linked therewith. For the sake of clarity, the process would have the following steps:
1. Introducing the rod (23) through the hole (25) until the arms (24) can be expanded.
2. Pulling the rod (23) until the arms open to position (24') and are in contact with the balancing block (21).
3. Moving the assembly consisting of the locking element (20), the cylinder (28), and the set of scrapers (26) until it contacts the other face of the balancing block (21).
4. Activating the locking element (20) so that it is integral with the rod (23).
5. Activating the cylinder (28) the plunger of which has a path equivalent to the thickness of the block.
6. The plunger of the cylinder (28) pushing the scrapers (26) between the balancing block (21) and the inner face of the beam (3) until breaking the adhesive fixing said block to the inner face of the beam.

To extract the balancing block (21), the tool (22) is introduced through passage (25) and the arms (24) are deployed to position (24'). The cylinder (28) is then activated to move the set of scrapers (26) until they go between the balancing block (21) and the inner surface of the beam (3), detaching the balancing block, a situation after which said balancing block is driven out of the blade by pulling the central rod (23), with the arms (24') deployed.

Figure 11:
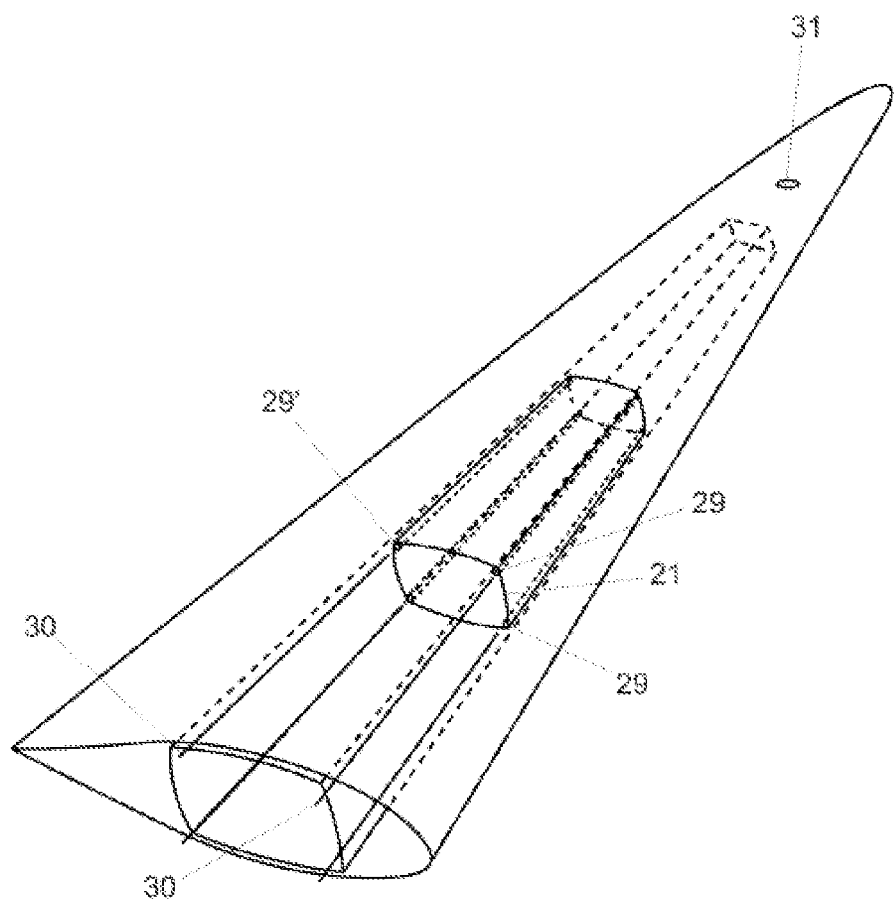
FIGS. 11 to 14 show different steps of the process of extracting the balancing block by means of applying heat.
Figure 12:
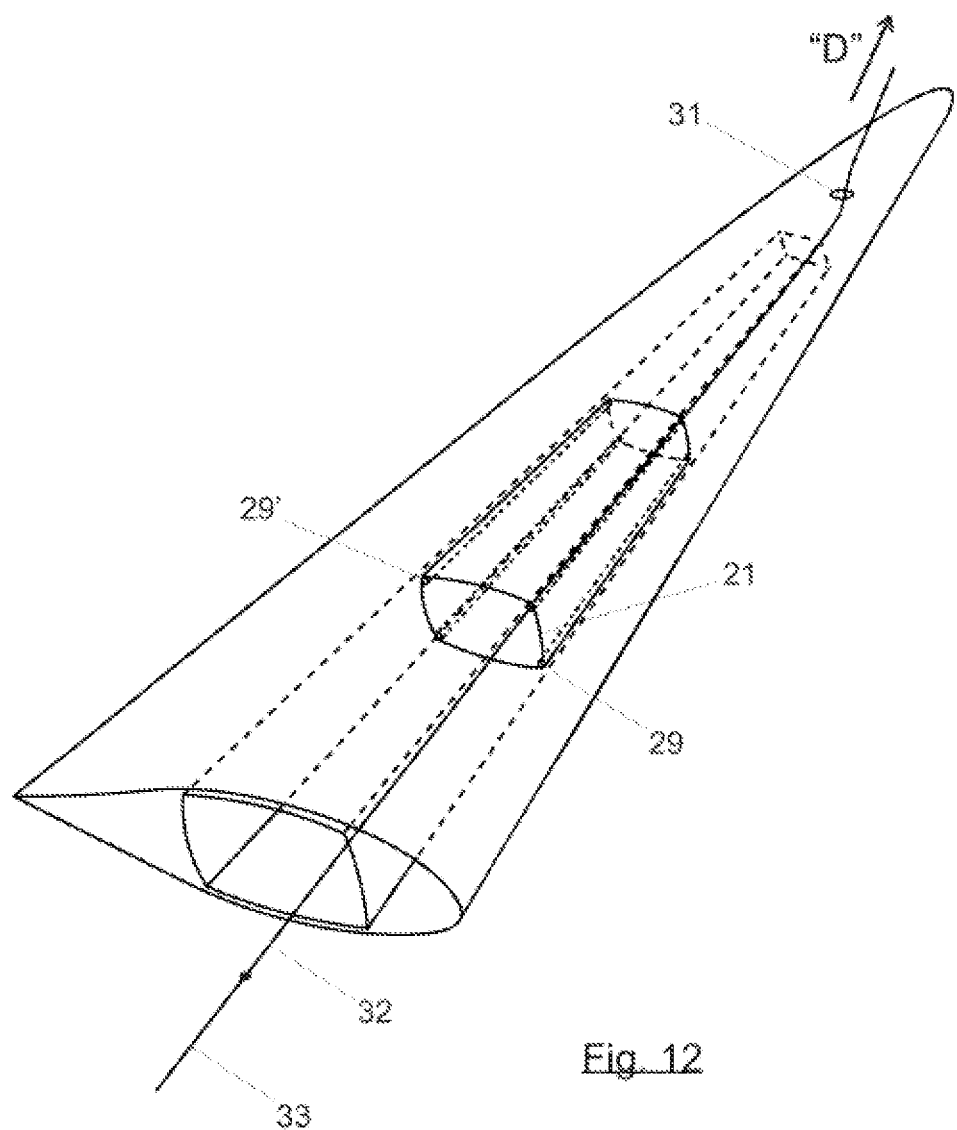

The process of cutting the layer of glue attaching the balancing block (21) to the wall of the beam (3) can also be carried out in the following manner:
1. Making through holes (29-29'), FIG. 11, at the vertices on a face of the balancing block (21) by means of a glow rod (30), laser, or any other method.
2. Making a hole (31) at the tip of the blade.
3. Introducing a rod (32) through the tip of the blade, FIG. 12, said rod going through the block through one of the holes (29) made in step (1).

Figure 13:
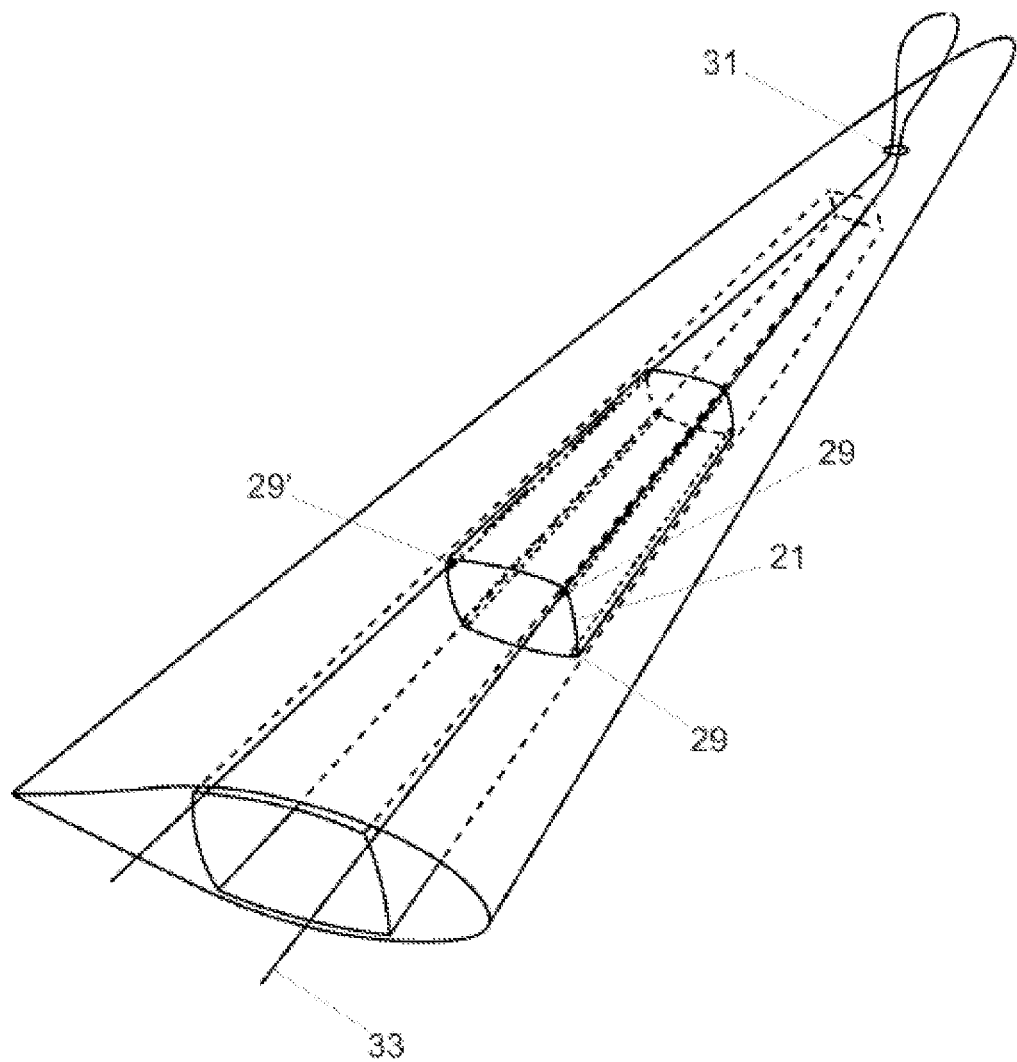
Figure 14:
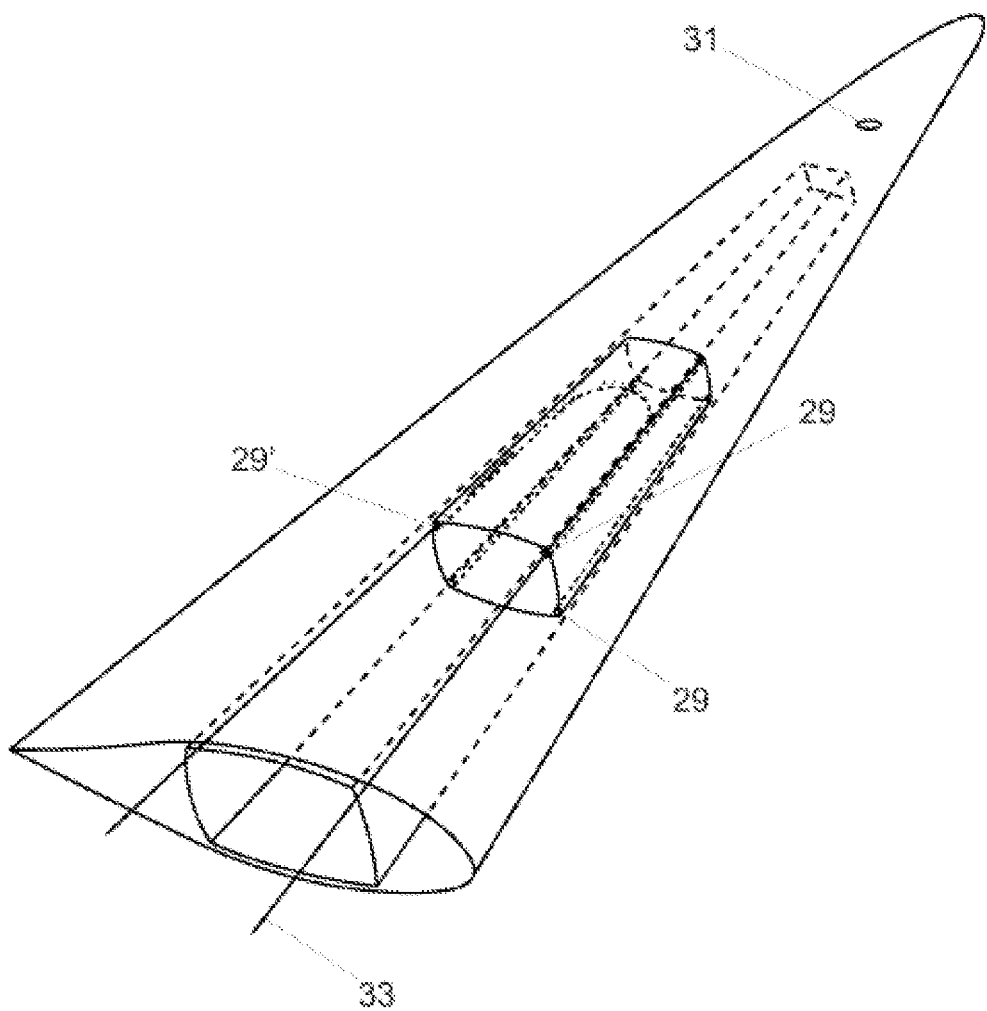

4. Extracting the rod (32) through the root of the blade, where there is attached thereto a wire (33) having a segment or section capable of glowing.
5. Pulling the rod (32) in direction "D" until an end of the wire (33) is extracted through the tip of the blade.
6. Introducing the rod (32) from the root of the blade, said rod going through the block through the other hole (29') until the rod (32) is extracted through hole (31).
7. Fastening the end of the wire (33) left free at the tip of the blade in step 5 to the rod (32).
8. Pulling the rod (32) from the root to move the wire (33) through the hole (29'), FIG. 13.
9. Once the block is surrounded by the wire on the upper face thereof, causing the section of the wire arranged between the holes (29 and 29') on the face of the block which is the closest to the tip of the blade to glow by means of electrical resistance.
10. Pulling the ends of the wire (33) from the root towards the root and upwards so that the glowing sector of the wire, FIG. 14, gradually cuts the glue attaching the block to the inner face of the beam.
11. Repeating the process for the other three faces attaching the block to the beam.

Figure 15:
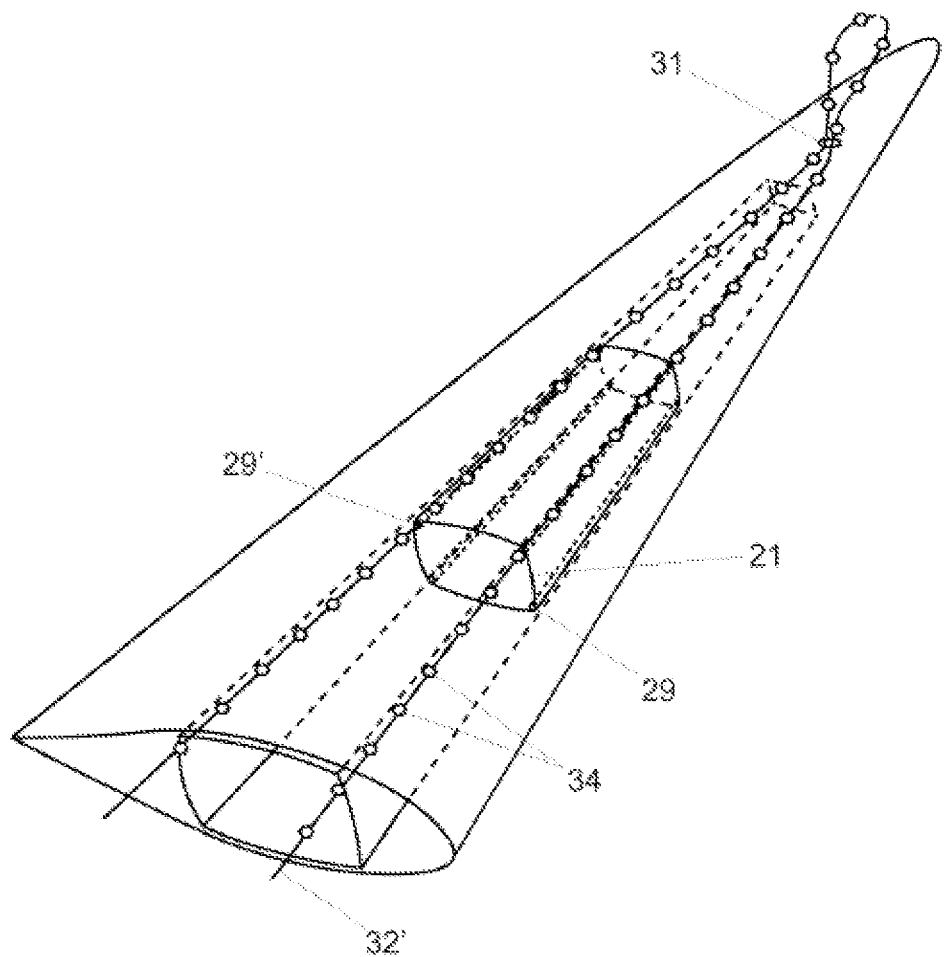
FIGS. 15 and 16 show two successive steps of the process of extracting the balancing block by means of cutting the layer of glue attaching said block to the beam.
Figure 16:
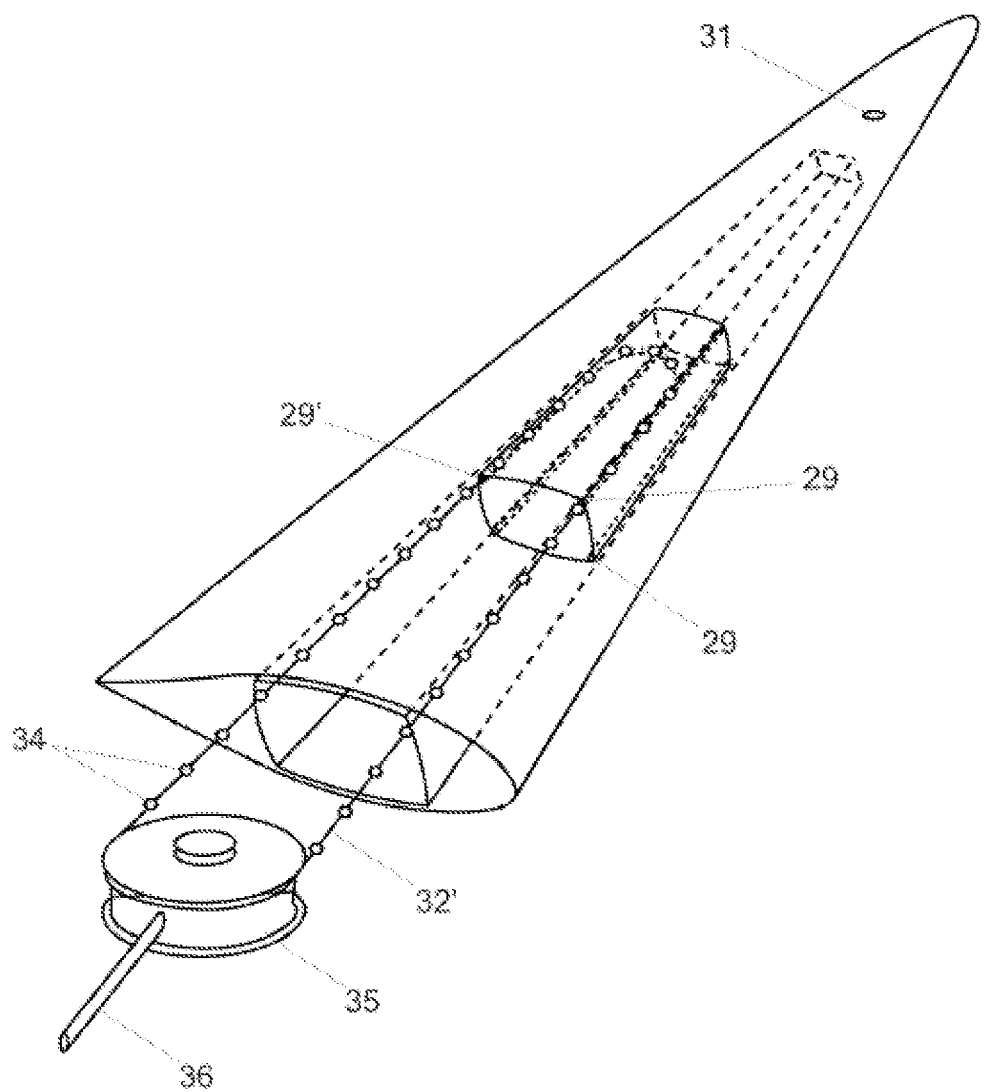

According to a possible variant of implementation, the wire which is used for cutting the glue is made up of a resistant wire (32'), FIG. 15, for example, a nylon wire or line, incorporating knots (34) or linked abrasive balls.

Once the wire is installed as described in steps 1 to 8 of the preceding method, a loop joining the two ends is formed and it is passed through the border of a wheel or roller (35) with notches to receive the knots or balls so that, by means of the rotation thereof, a rotating loop is generated, as if it were a chain drive. The wheel-axle assembly moves as cutting progresses and it is kept taut by means of an actuating element (36), such as a spring, for example, which assures that the loop is always taut and that the necessary friction is produced at the other end so that it will gradually cut the layer of glue.

The layer of glue can be cut from the entire contour of the block by means of using laser striking from the face of the block facing the root of the blade.

Finally, the balancing block (21) can be separated by means of applying heat on the faces of said block in the following manner.

Figure 17:
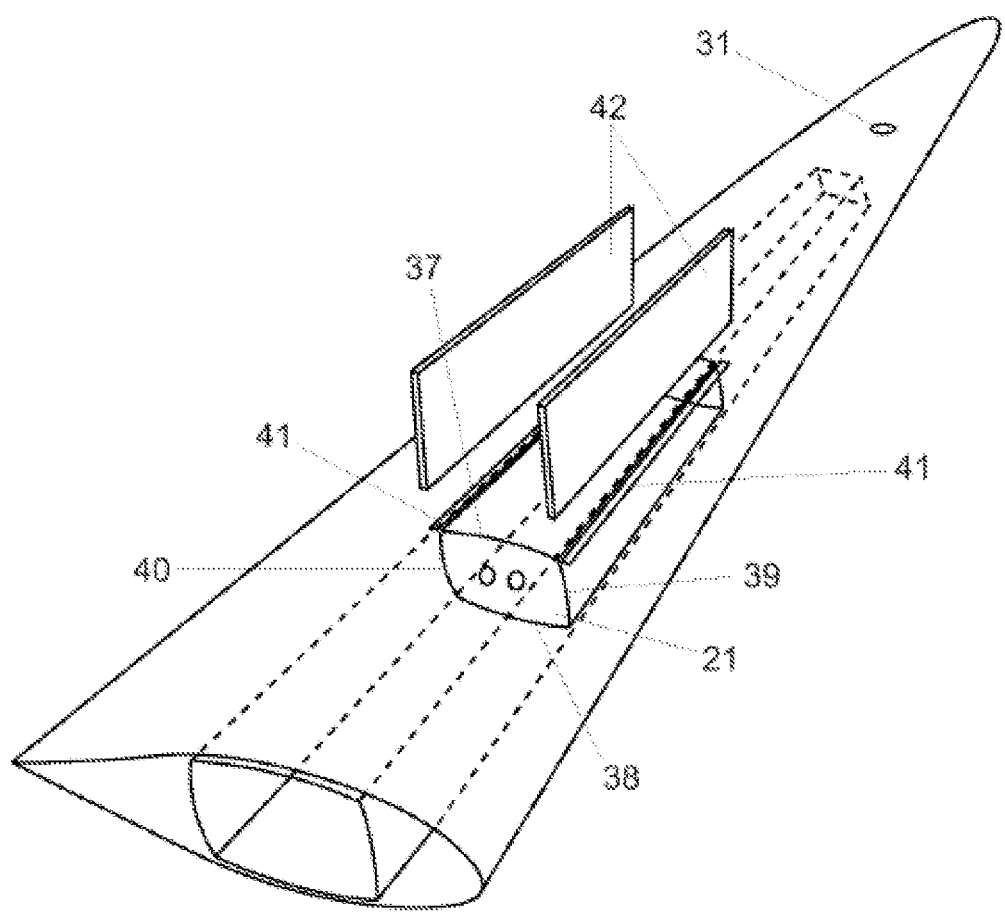
FIGS. 17 and 18 show a possible variant for performing the process of extracting the balancing block by means of applying heat.

Heat is applied directly on two of the faces (37 and 38) through the section of the upper and lower shell of the walls of the beam, until the glue is heated enough to cause it to disintegrate. For the other two faces (39 and 40), grooves (41) will be made in one of the shells for introducing heater plates (42) which will transmit heat through the walls (39 and 40) of the beam until the glue is heated to cause it to disintegrate, FIG. 17.

Figure 18:
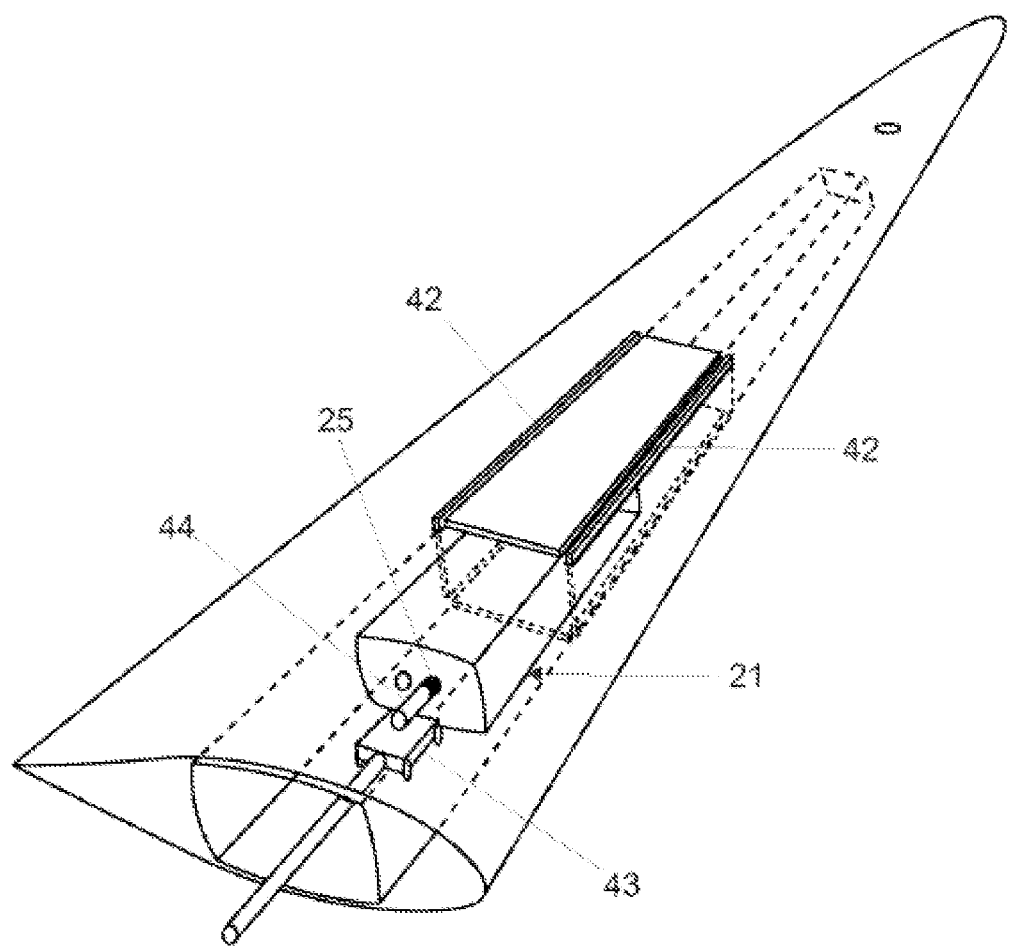

Once the glue has disintegrated, the block is extracted by fixing it to an element which can be pulled from the root of the blade, such as, for example, a carriage (43) incorporating a head with a screw or bolt (44) which is screwed into one of the through holes (25) of the balancing block. The carriage is then pulled from the open root of the blade for extracting it together with the block, as shown in FIG. 18.

The remaining disintegrated glue can be removed by means of mechanical brushing or other cleaning methods with pressurized water or solvent.

The invention claimed is:

1. A method for applying an inner covering for a wind turbine blade, comprising:
   a) forming on a preforming mold, by means of precut fabrics or layers of composite materials based on glass or carbon fibers and resins that are not cured or only partially cured, a sheath with a flexible wall that is open at the root thereof and has shapes and dimensions that are about the same as the inner shapes and dimensions of the structural element of the blade;
   b) preparing the inner surface of the structural element by means of introducing a tool with blasting nozzles and washing nozzles to form a clean and rough surface which facilitates adherence of the covering made up of the sheaths;
   c) mounting the sheath on a support or tool which is introduced with said sheath into the blade through the open root thereof until reaching the tip of the blade;
   d) arranging between the support or tool and the sheath an inflatable chamber which, by means of the inflation thereof, is capable of attaining the inner dimensions and shapes of the structural element of the blade;
   e) introducing the support with the sheath and inflatable chamber into the structural element of the blade through the open root thereof, and inflating the inflatable chamber until the sheath is applied on the inner surface of the structural element of the blade;
   f) curing and hardening the composite materials forming the sheath and the sheath adhering to the inner surface of the structural element of the blade.

2. The method according to claim 1, wherein an outer peripheral channel is formed in the root of the sheath as a prolongation of the wall of said sheath, which is coupled on the edge of the wall of the blade limiting the open root thereof, the outer surface overlapping the wall of the blade a sufficient length for the assembly bolts of the blade to go through same.

3. The method according to claim 1, wherein the sheath is formed by at least two longitudinal parts attached to one another.

4. The method according to claim 1, wherein the tool or support, with the sheath or parts of the sheath and with the inflatable chamber, is driven through the blade by means of pulling it using cables which are extracted out through holes made at the tip of the blade.

5. The method according to claim 1, wherein the sheath is formed on the inner surface of the structural element of the blade, on which the fabrics or layers forming said sheath are applied and compacted by means of the inflatable chamber introduced in the blade through the open root thereof.

6. The method according to claim 1, wherein the sheath is attached to the inner surface of the blade by means of an adhesive including the composite materials forming the fabrics or layers.

7. The method according to claim 1, wherein a reinforcement adhesive is furthermore applied for attaching the sheath to the inner surface of the blade.

8. The method according to claim 1, wherein in blades the structural element of which has a balancing block, before introducing the support with the sheath and inflatable chamber into the structural element of the blade, the balancing block is extracted from the inside of said structural element.

9. The method according to claim 1, wherein the composite materials forming the sheath are cured and hardened by means of blowing hot air through the open root of the blade.

10. The method according to claim 1, wherein the composite materials forming the sheath are cured and hardened by means of electric heating blankets arranged between the inflatable chamber and the fabrics of composite materials forming said sheath.

11. The method according to claim 1, wherein the composite materials forming the sheath are cured and hardened by means of electric heating blankets arranged on the shells in the area of adherence to the structural element.

12. The method according to claim 8, wherein the balancing block is extracted by means of detaching it from the inner surface of the structural element of the blade by applying heat on the faces of said block, and pulling the block through the open root of the blade.

13. The method according to claim 8, wherein the balancing block is extracted by means of cutting the layer of adhesive attaching the balancing block to the walls of the structural element of the blade and then pulling said block through the open root of the blade.

* * * * *